US010169843B1

United States Patent
Amer et al.

(10) Patent No.: US 10,169,843 B1
(45) Date of Patent: Jan. 1, 2019

(54) TEMPORAL FOVEATED RENDERING USING MOTION ESTIMATION

(71) Applicants: ADVANCED MICRO DEVICES, INC., Sunnyvale, CA (US); ATI TECHNOLOGIES ULC, Markham (CA)

(72) Inventors: Ihab Amer, Markham (CA); Guennadi Riguer, Markham (CA); Ruijin Wu, San Diego, CA (US); Skyler J. Saleh, San Diego, CA (US); Boris Ivanovic, Markham (CA); Gabor Sines, Markham (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 0 days.

(21) Appl. No.: 15/818,072

(22) Filed: Nov. 20, 2017

(51) Int. Cl.
*G06T 3/40* (2006.01)
*G06T 7/136* (2017.01)
*G06T 7/13* (2017.01)
*G06T 7/246* (2017.01)

(52) U.S. Cl.
CPC ............ *G06T 3/403* (2013.01); *G06T 7/13* (2017.01); *G06T 7/136* (2017.01); *G06T 7/248* (2017.01)

(58) Field of Classification Search
None
See application file for complete search history.

(56) References Cited

U.S. PATENT DOCUMENTS

| 2013/0202194 | A1* | 8/2013 | Graziosi | G06T 3/403 |
| | | | | 382/154 |
| 2016/0364881 | A1* | 12/2016 | Mallinson | G06T 7/20 |
| 2016/0379400 | A1* | 12/2016 | Maksymczuk | G06T 1/20 |
| | | | | 345/419 |
| 2018/0081178 | A1* | 3/2018 | Shpunt | G06F 1/1694 |
| 2018/0115745 | A1* | 4/2018 | Kimura | G09G 5/00 |
| 2018/0165799 | A1* | 6/2018 | Pohl | G06T 5/006 |
| 2018/0165878 | A1* | 6/2018 | Khan | G06F 3/012 |

OTHER PUBLICATIONS

Didyk, Piotr, et al. "Perceptually-motivated real-time temporal upsampling of 3D content for high-refresh-rate displays." Computer Graphics Forum. vol. 29. No. 2. Oxford, UK: Blackwell Publishing Ltd, 2010.*
Stengel, Michael, et al. "Temporal video filtering and exposure control for perceptual motion blur." IEEE transactions on visualization and computer graphics 21.5 (2015): 663-671.*

* cited by examiner

*Primary Examiner* — Ryan M Gray

(57) ABSTRACT

A processing system selectively renders pixels or blocks of pixels of an image and leaves some pixels or blocks of pixels unrendered to conserve resources. The processing system generates a motion vector field to identify regions of an image having moving areas. The processing system uses a rendering processor to identify as regions of interest those units having little to no motion, based on the motion vector field, and a large amount of edge activity, and to minimize the probability of unrendered pixels, or "holes", in these regions. To avoid noticeable patterns, the rendering processor applies a probability map to determine the possible locations of holes, assigning to each unit a probability indicating the percentage of pixels within the unit that will be holes, and assigning a lower probability to units identified as regions of interest.

20 Claims, 7 Drawing Sheets

TEMPORAL FOVEATED RENDERING USING MOTION ESTIMATION

BACKGROUND

Computer graphics or image rendering is the process by which a computing system displays an image based on a computer program. A scene file containing information regarding objects in a scene is passed to one or more processing units that render an image for display based on the scene file. A display contains an array of pixels, each of which is the smallest addressable element in the display device. Rendering each pixel of a display to generate a high-resolution image is computationally intensive. To reduce the rendering workload, some regions of an image may be rendered at lower resolution by leaving "holes", or unrendered pixels. The holes may be "filled in" with techniques of varying complexity in an attempt to make them less obvious. However, the result of leaving holes at regions of the image that are of interest to a viewer and the method to fill them in may noticeably detract from the image quality.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
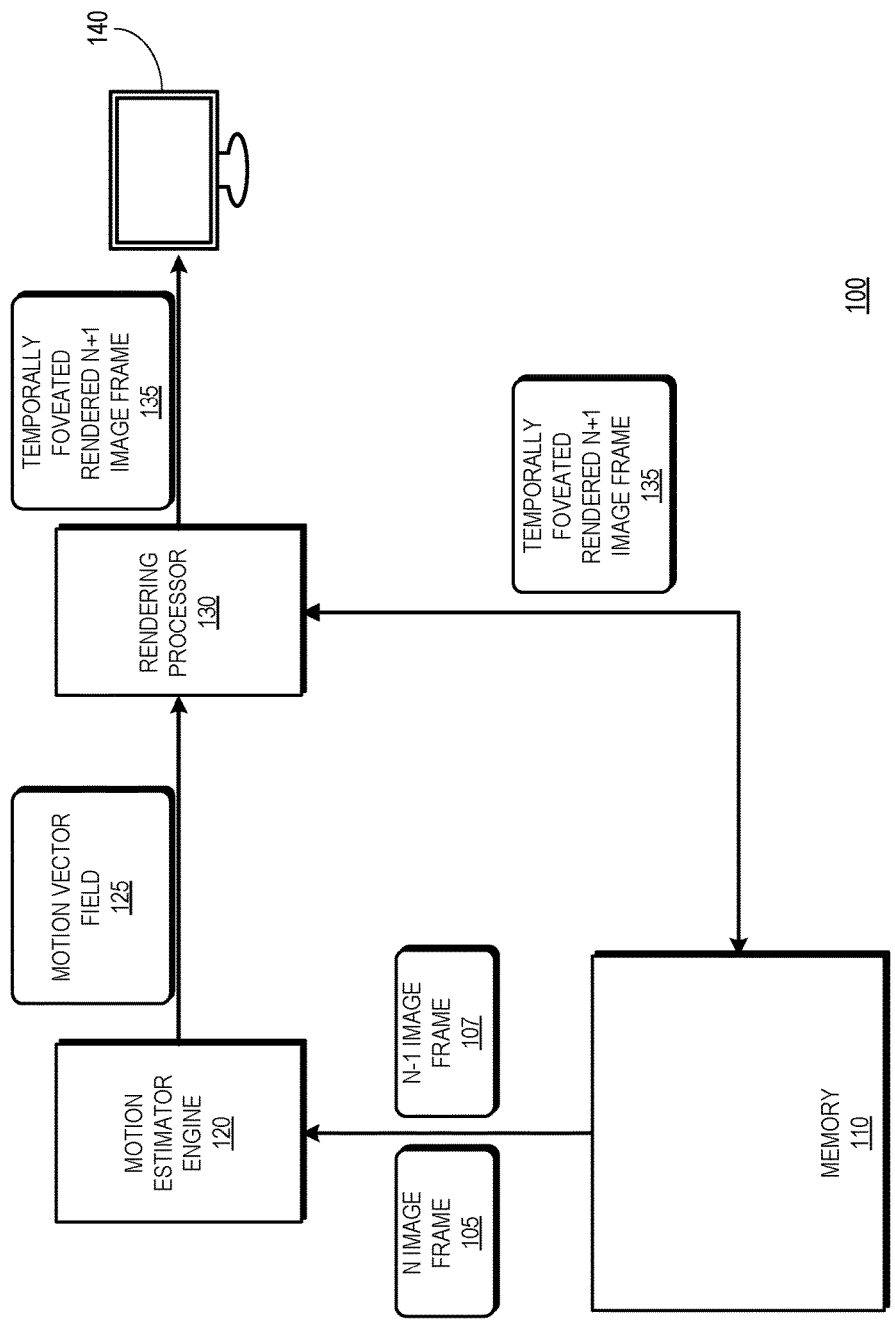
FIG. 1 is a block diagram of a processing system that includes a motion estimator engine to generate a motion vector field for rendering a temporally foveated image according to some embodiments.

Temporally foveated rendering can be used to reduce the computational workload on a processing system by selectively rendering pixels or blocks of pixels of an image and leaving some pixels or blocks of pixels unrendered. By identifying which regions of an image are of interest to a viewer, it is possible to render in highest resolution those areas of the image on which the viewer is expected to focus (the "foveal region"), and to select more locations for "holes", or unrendered pixels, outside the region of interest so that they will be less noticeable to the viewer. The further a pixel is from a region is interest, the more holes could be potentially tolerated with acceptable quality.

The processing system uses a motion estimator engine to divide a previously rendered image into units of one or more pixels and generate a motion vector field identifying those units having moving areas. The processing system uses a rendering processor to identify as regions of interest those units having little to no motion, based on the motion vector field, and a large amount of edge activity, and to minimize the probability of holes in these regions. To avoid noticeable patterns, the rendering processor applies a probability map to determine the possible locations of holes, assigning to each unit a probability indicating the percentage of pixels within the unit that will be holes. For example, if the motion estimator engine identifies that a region of little to no movement is located at the upper right quadrant of an image, the rendering processor will apply a probability map that identifies more units with a higher probability of holes outside the upper right quadrant of the image. In this way, the units having little to no motion and/or higher edge activity will have fewer holes.

The motion estimator engine examines the two most-recently fully-rendered images (referred to as the "N" and "N−1" images) to create a motion vector field that measures the motion of the previous two images. The motion estimator engine compares each unit, or block, of the N and N−1 images to determine motion vectors for each block. A block is a uniform size of a group of pixels used for block-based motion estimation. In some embodiments, a motion estimator engine that is not block-based generates motion vectors per pixel, or per a group of multiple pixels. Based on an analysis of the N and N−1 images, the motion estimator engine generates a motion vector field, which indicates areas, magnitude, and direction of motion between the previous two images.

If the N and N−1 images correlate sufficiently to conclude that the N image is a continuation of the N−1 image that immediately preceded it, the rendering processor assumes that the motion vector field is valid (e.g., there was no scene change) and that the units of the next image (referred to as the "N+1" image) will continue along the same trajectory. The rendering processor also analyzes groups of pixels of the N image and identifies which groups of pixels of the N image contain edges as well as the strength of the edges, and it may calculate other relevant metrics. In some embodiments, the groups of pixels that the rendering processor analyzes are different (i.e., in size) from the analysis groups used by the motion estimator engine. In some embodiments, the rendering processor identifies differences between adjacent pixels (i.e., edges) that are greater than a threshold. Based on one or more of the motion vector fields, the detected edges, and the other relevant metrics, the rendering processor generates a probability map indicating the probability that each pixel within a unit or "picture area" of the N+1 image will be a hole. In some embodiments, the units of the probability map form a uniform or non-uniform grid of blocks of multiple pixels. The sizes of the units of the probability map need not be correlated to sizes of units used by the underlying metrics. The probability map assigns a lower probability of holes to those units that are determined to contain more than a first threshold amount or strength of edges, and to areas that have less than a second threshold amount of motion. Other relevant metrics will decrease the probability of a unit containing a hole as the importance of the unit is deemed higher.

In the case of a scene change, the motion vector field provides no useful information and the rendering processor applies a default probability map. In some embodiments, the default probability map assigns a uniform probability across the N+1 image. In some embodiments, the default probability map assigns lower hole probability densities in the middle of the image and higher hole probability densities approaching the edges of the image.

In addition, the rendering processor identifies predictors of how holes should be filled based on temporally-neighboring images to make the holes less conspicuous to the viewer. Thus, if a unit of the N+1 image contains a hole, the rendering processor (using the motion vector field from the motion estimator engine) identifies candidate pixels of the N image that correspond to the hole of the N+1 image, and fills the hole using spatio-temporal data from the available pixels (referred to as "spatio-temporal" interpolation). In some embodiments, the rendering processor fills the hole based additionally on local structure and temporal changes.

However, if the immediately preceding image has a temporal correlation below a threshold—for example, in the case of a scene change—the rendering processor fills the hole using a spatial interpolation algorithm. In some embodiments, the spatial interpolation algorithm fills the hole based on a local average of spatially neighboring pixels of the image. In some embodiments, the spatial interpolation algorithm additionally fills the hole based on examining local structure.

FIG. 1 is a block diagram of a processing system 100 that includes a motion estimator engine 120 to generate a motion vector field 125 and a rendering processor 130 for rendering a temporally foveated image 135 based on the motion vector field 125 according to some embodiments. The processing system 100 can be incorporated in any of a variety of electronic devices, such as a server, personal computer, tablet, set top box, gaming system, and the like. The motion estimator engine 120 is coupled to a memory 110 and the rendering processor 130, which provides the temporally foveated rendered image 135 to a display 140. The rendering processor 130 executes instructions and stores information in the memory 110 such as the results of the executed instructions. For example, the memory 110 stores a plurality of previously-rendered images (not shown) that it receives from the rendering processor 130. In some embodiments, the memory 110 is implemented as a dynamic random access memory (DRAM), and in some embodiments, the memory 110 is also be implemented using other types of memory including static random access memory (SRAM), non-volatile RAM, and the like. Some embodiments of the processing system 100 include an input/output (I/O) engine (not shown) for handling input or output operations associated with the display 140, as well as other elements of the processing system 100 such as keyboards, mice, printers, external disks, and the like.

The motion estimator engine 120 is configured to receive memory locations for a most recently rendered image (the N image) 105 and a second-most recently rendered image (the N−1 image) 107 from a central processing unit (CPU) (not shown). The motion estimator engine 120 compares the sequential previously-rendered images 105 and 107 stored at the memory 110 to generate the motion vector field 125.

The rendering processor 130 receives commands generated by a central processing unit (CPU) (not shown) instructing the rendering processor 130 to render a current (N+1) image (not shown). Some embodiments of the rendering processor 130 include multiple processor cores (not shown in the interest of clarity) that independently execute instructions concurrently or in parallel. Some embodiments of a command generated by the CPU include information defining textures, states, shaders, rendering objects, buffers, and the like that are used by the rendering processor 130 to render the objects or portions thereof in the N+1 image. The rendering processor 130 renders the objects to produce values of pixels that are provided to the display 140, which uses the pixel values to display an image that represents the rendered objects.

To facilitate more efficient rendering of images, the rendering processor 130 identifies edges of the N image 105, and generates a probability map based on the identified edges and the motion vector field 125 indicating a probability for each unit of the N+1 image that the pixels within the unit will be holes. The rendering processor 130 renders the N+1 image, leaving holes based on the probability map. The rendering processor 130 is further configured to identify fill values for holes based on either temporally or spatially neighboring units. Based on the motion vector field 125 provided by the motion estimator engine 120, the rendering processor 130 identifies the pixels of the N image that correspond to the holes of the N+1 image. If the corresponding pixels of the N image are rendered (i.e., not holes), the rendering processor 130 identifies the values of the corresponding rendered pixels of the N image as the values to fill the holes of the N+1 image using a "spatio-temporal" interpolation method (e.g., a method based on temporal behavior and the local structure). If the corresponding pixels of the N image are holes, or if the corresponding units of the N image have a correspondence to the current image below a threshold (e.g., in the case of a scene change), the rendering processor 130 bases the values to fill the holes of the N+1 image on the values of the pixels that are spatially adjacent to the holes of the N+1 image (referred to as "spatial interpolation"). In some embodiments, the rendering processor 130 bases the spatial interpolation on a simple average. In some embodiments, the rendering processor 130 bases the spatial interpolation additionally on the local structure.

In operation, the motion estimator engine 120 receives the memory locations of the N and N−1 images 105 and 107 from the CPU (not shown). The motion estimator engine 120 analyzes at least the N and N−1 images 105 and 107 stored at the memory 110 to generate a motion vector field 125 that estimates moving areas of the N+1 image (not shown). The motion vector field 125 indicates the direction and/or magnitude of motion for each unit of the image. The motion estimator engine 120 provides the motion vector field 125 to the rendering processor 130.

The rendering processor 130 receives the motion vector field 125 from the motion estimator engine 120, and also analyzes the N image 105 to identify edges of objects. Based on the identified edges and movement indicated by the motion vector field 125, the rendering processor 130 generates a probability map (not shown) indicating probability values for each unit of the N+1 image that the pixels within the unit will be holes. In some embodiments, the probability map indicates lower hole probabilities for those units that are identified as having a higher than average amount of edges, or a number and/or strength of edges above a first threshold. In some embodiments, the probability map indicates lower hole probabilities for those units identified as having little to no movement, or movement below a second threshold. In some embodiments, the first and second thresholds are fixed parameters, and in some embodiments, the first and/or second threshold is adaptive, based on current video or other system parameters. If the N and N−1 images 105 and 107 have a correlation below a third threshold (indicating a scene change), the rendering processor applies a default probability map that does not depend on the motion vector field 125.

The rendering processor 130 renders the N+1 image, leaving holes as indicated by the probability map. The rendering processor 130 further identifies values to use as fillers for holes. The rendering processor 130 fills the holes using the identified values to generate a temporally foveated rendered image 135. The rendering processor 130 provides the temporally foveated rendered image 135 to the display 140, which uses the pixel values of the temporally foveated rendered image 135 to display an image that represents the N+1 image. The rendering processor 130 also provides a copy of the temporally foveated rendered image 135 to the memory 110, where it is stored for subsequent generation of a motion-compensated version of the next image.

Figure 2:
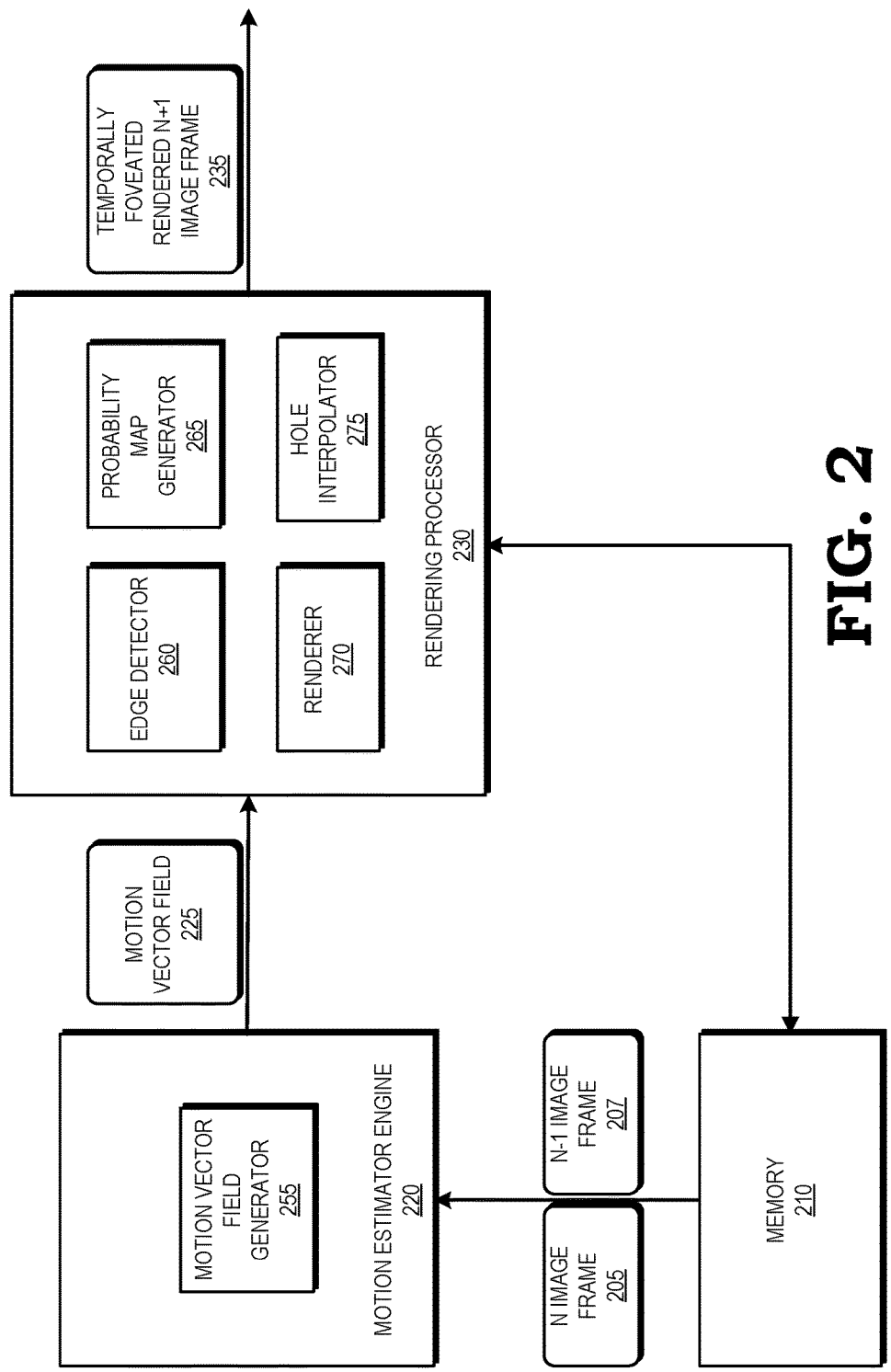
FIG. 2 is a block diagram of the motion estimator engine and rendering processor of FIG. 1 according to some embodiments.

FIG. 2 is a block diagram of a motion estimator engine 220 and rendering processor 230 of the processing system 100 of FIG. 1 according to some embodiments. The motion estimator engine 220 outputs a motion vector field 225, which is used by the rendering processor 230 to generate a temporally foveated rendered N+1 image 235.

The motion estimator engine 220 is configured to generate a motion vector field 225 based on estimates of motion derived from a comparison of a previously-rendered N image 205 and N−1 image 207 stored at a memory 210. The motion estimator engine 220 includes a motion vector field generator 255. The motion vector field generator 255 is configured to estimate movement of objects in consecutive images. Motion estimation assumes that in most cases consecutive images will be similar except for changes caused by objects moving within the images. To estimate motion, the motion vector field generator 255 determines motion vectors that describe the transformation from one two-dimensional image to another from adjacent images of an image sequence. A motion vector is a two-dimensional vector that provides an offset from the coordinates in one image to the coordinates in another image.

The motion vector field generator 255 compares corresponding pixels of the N image 205 (the most recently rendered image) and the N−1 image 207 (the image rendered immediately prior to the N image) to create a motion vector field 225 that models the movement of objects between the two images. In some embodiments, the motion vector field generator 255 employs a block matching algorithm such as exhaustive search, three step search, simple and efficient search, four step search, diamond search, or other algorithms used in block matching. If the comparisons between the N and N−1 images 205 and 207 indicate large changes between images, the rendering processor may determine that the temporal correlation between the N and N−1 images is below a threshold.

The rendering processor 230 includes an edge detector 260, a probability map generator 265, a renderer 270, and a hole interpolator 275. In some embodiments, the edge detector 260, probability map generator 265, renderer 270, and hole interpolator 275 are implemented as shader programs on the rendering processor 230. In some embodiments, one or more of the edge detector 260, a probability map generator 265, a renderer 270, and a hole interpolator 275 are implemented as fixed function hardware in the motion estimator engine 220.

The edge detector 260 is configured to identify edges of objects based on the motion map generated by the motion map generator 255. The edge detector 260 identifies points in the N image 205 at which the image brightness changes more than a threshold amount. A sharp change in image brightness may indicate a discontinuity in depth, surface orientation, material properties, or variations in scene illumination. The edge detector 260 may detect series of connected edges that indicate the boundaries of objects in the N image 205. Because boundaries of objects are likely to correspond to regions of interest, those portions of the N image 205 that the edge detector 260 identifies as containing edges are assigned a lower probability of containing holes, as described herein.

The probability map generator 265 is configured to generate a probability map for hole identification (not shown). The probability map assigns a probability to regions of the N+1 image (the next image to be rendered) (not shown) indicating a percentage of the pixels of each region that will contain holes. The probability map generator 265 generates the probability map based on the motion vector field 225 and the edges detected by the edge detector 260. The probability map generator 265 assigns lower probabilities of containing holes to those regions of the N+1 image identified as containing little to no motion and/or more edges. In some embodiments, if the rendering processor 230 determines that the temporal correlation between the N and N−1 images 205 and 207 is below a threshold, the rendering processor 230 assigns default probabilities to each region of the N+1 image.

The renderer 270 is configured to render the N+1 image, leaving holes as indicated by the probability map. In some embodiments, the renderer 270 includes a plurality of shaders (not shown), each of which is a processing element configured to perform specialized calculations and execute certain instructions for rendering computer graphics. For example, in some embodiments, the shaders compute color and other attributes for each pixel of a display. In some embodiments, the shaders of the renderer 270 are two-dimensional (2D) shaders such as pixel shaders, or three-dimensional shaders such as vertex shaders, geometry shaders, or tessellation shaders, or any combination thereof. In some embodiments, the shaders work in parallel to execute the operations required to render the N+1 image.

The hole interpolator 275 is configured to assign fill values for each of the holes of the N+1 image. The hole interpolator 275 determines a "cost" associated with the motion vector field 225. The cost represents the aggregate magnitude of each of the motion vectors of the motion vector field 225. In determining the cost, the hole interpolator 275 accounts for global motion across the image, for example, as occurs when a camera pans across a scene. If the cost is above a threshold (e.g., in the case of a scene change, and discounting for global motion), the hole interpolator 275 determines that the temporal correlation between the N image 205 and the N−1 image 207 is too low for the motion vector field 225 to reliably predict the values of the pixels of the N+1 image. If the cost is above the threshold, the hole interpolator 275 assigns a value for filling each hole of the N+1 image based on a local average of the pixels adjacent to the hole.

If the cost is at or below the threshold, the hole interpolator 275 calculates the fill value for the N+1 image based on corresponding pixels of the N image 205. If the corresponding pixels of the N image 205 are rendered pixels (i.e., not holes), the hole interpolator 275 identifies the values of the corresponding rendered pixels as the fillers for the holes of the N+1 image. In some embodiments, the hole interpolator 275 calculates the fill value for holes of the N+1 image based on a local average and/or local structure. For example, if the corresponding pixel of the N image 205 is white, but the local structure of the N+1 image for that pixel is a black line, the hole interpolator 275 employs logic to fill the hole based on local structure or statistics. In some embodiments, if the pixels of the N image 205 corresponding to the holes of the N+1 image are also holes, the hole interpolator 275 uses the motion vector field 225 to predict the motion from the N image 205 to the N+1 image, and fills the holes of the N+1 image with the pixel values of the N image 205 of the units predicted to move into the holes of the N+1 image.

In some embodiments, the motion vector field generator 255 generates a motion vector field 225 by measuring the motion between N image and the N+1 image, and the rendering processor then fills the holes in N+1 based on the motion vector field and previous pictures. The motion vector field generator 255 performs a motion search of multiple comparisons against many candidate areas of the two images. To perform the comparisons required in a motion search, the motion vector field generator replaces the holes of the N+1 image with a constant. The motion vector field generator 255 considers candidate comparison areas in the N image that are compared to the N+1 image to have the same constant at the same locations, in other words, at locations co-sited to the holes in image N+1. By replacing the holes of the N+1 image and comparison areas of the N image with the same constant, the motion vector field generator 255 searches for movement while ignoring the holes. Using the constant as a replacement for the holes of the N+1 image and the corresponding pixels of the N image, the motion vector field generator 255 compares the N and N−1 images 205 and 207, while ignoring the holes of the N+1 image, to create a revised motion vector field. The hole interpolator 275 compares the holes of the N+1 image to the revised motion vector field, and assigns values for filling the holes of the N+1 image based on corresponding units of the revised motion map. In some embodiments, the hole interpolator 275 assigns values for filling some holes of the N+1 image based on a local average of the pixels adjacent to the hole, and assigns values for other holes of the N+1 image based on corresponding units of a revised motion map.

Figure 3:
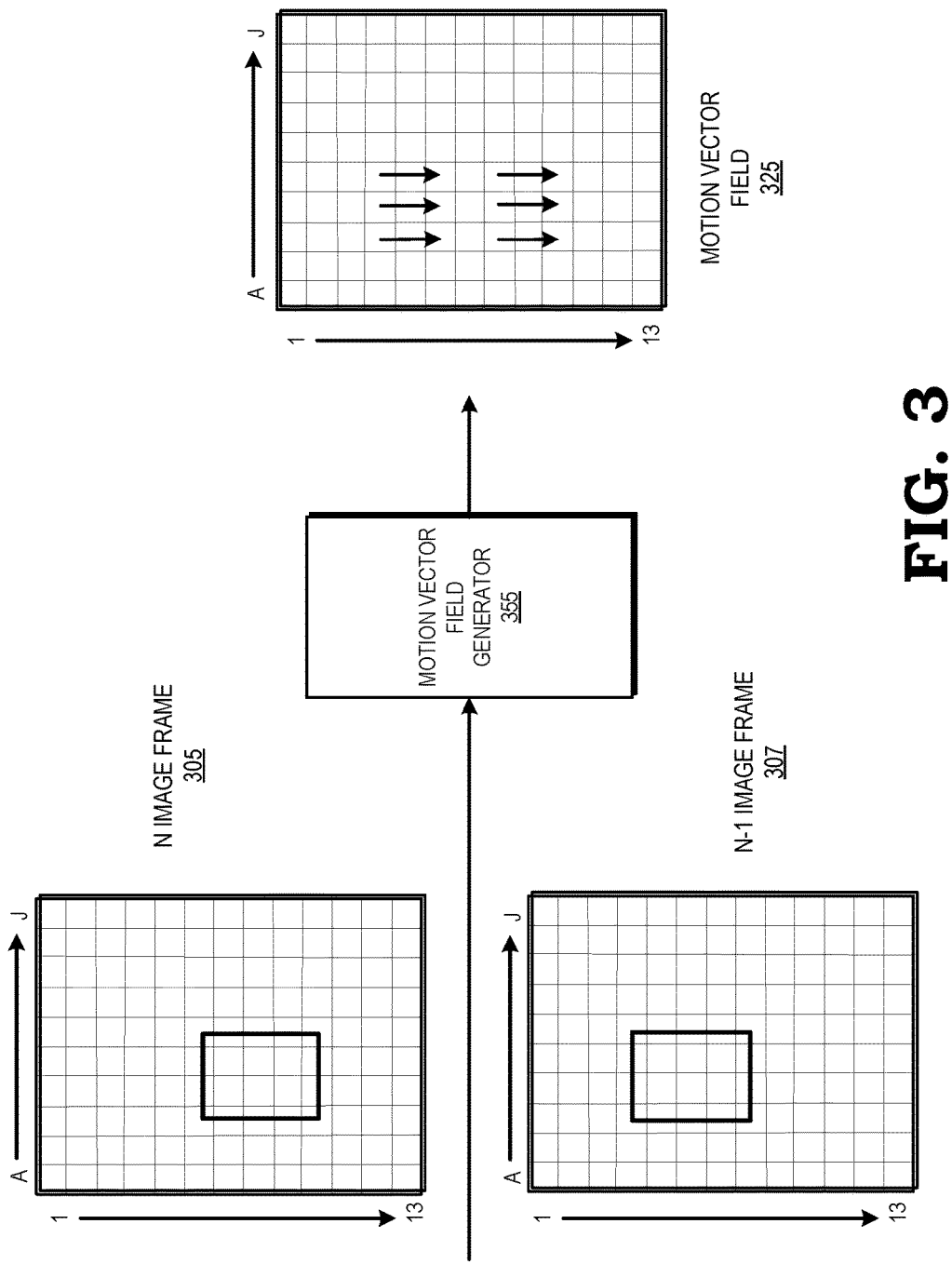
FIG. 3 is a block diagram of a motion vector field generator of the motion estimator engine of FIG. 2 according to some embodiments.

FIG. 3 is a block diagram of a motion vector field generator 355 of the motion estimator engine 220 of FIG. 2 according to some embodiments. The motion vector field generator 355 compares corresponding units, or groups of pixels, of the N image 315 and the N−1 image 317 to create a motion vector field 325 of vectors that model the movement of an object from one unit to another across consecutive images. The motion vector field generator 355 may employ a block matching algorithm such as exhaustive search, three step search, simple and efficient search, four step search, diamond search, or other algorithms used in block matching. In the example illustrated in FIG. 3, the motion vector field generator 355 generates a motion vector field 325 containing motion vectors indicating motion, e.g., from unit C4 to unit C6, from unit D4 to unit D6, from unit E4 to unit E6, from unit C8 to unit C10, from unit D8 to unit D10, and from unit E8 to unit E10.

Figure 4:
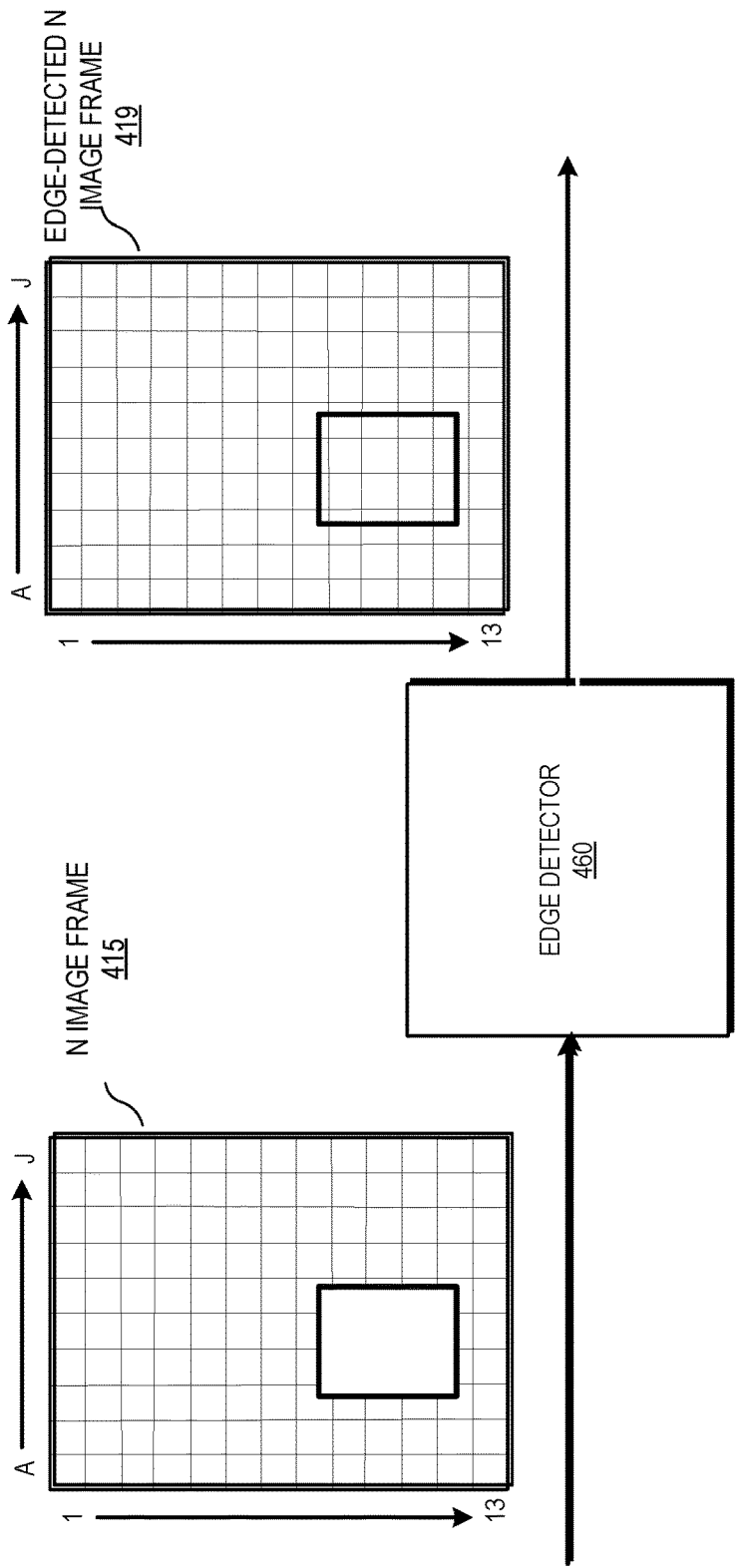
FIG. 4 is a block diagram of an edge detector of the rendering processor of FIG. 2 according to some embodiments.

FIG. 4 is a block diagram of an edge detector 460 of the rendering processor 230 of FIG. 2 according to some embodiments. The edge detector 460 detects changes in brightness within or between units of the N image 415. In some embodiments, the units analyzed by the edge detector 460 are the same groups of pixels that are analyzed by the motion vector field generator 355. In some embodiments, the units analyzed by the edge detector 460 are larger or smaller groups of pixels than the units that are analyzed by the motion vector field generator 355. The edge detector 460 identifies those units with brightness changes above a threshold as containing edges. The magnitude of the threshold will determine how many edges are detected. Thus, if the threshold is low, more edges will be detected, but the result may be susceptible to noise, and edges of irrelevant features may be detected. In the example illustrated in FIG. 4, the edge detector 460 detects changes in brightness in units C8, C9, C10, C11, C12, D8, E8, F8, F9, F10, F11, F12, D12, and E12. The edge detector 460 provides an edge-detected image 419 estimating that units C8, C9, C10, C11, C12, D8, E8, F8, F9, F10, F11, F12, D12, and E12 contain edges to the probability function generator (not shown).

Figure 5:
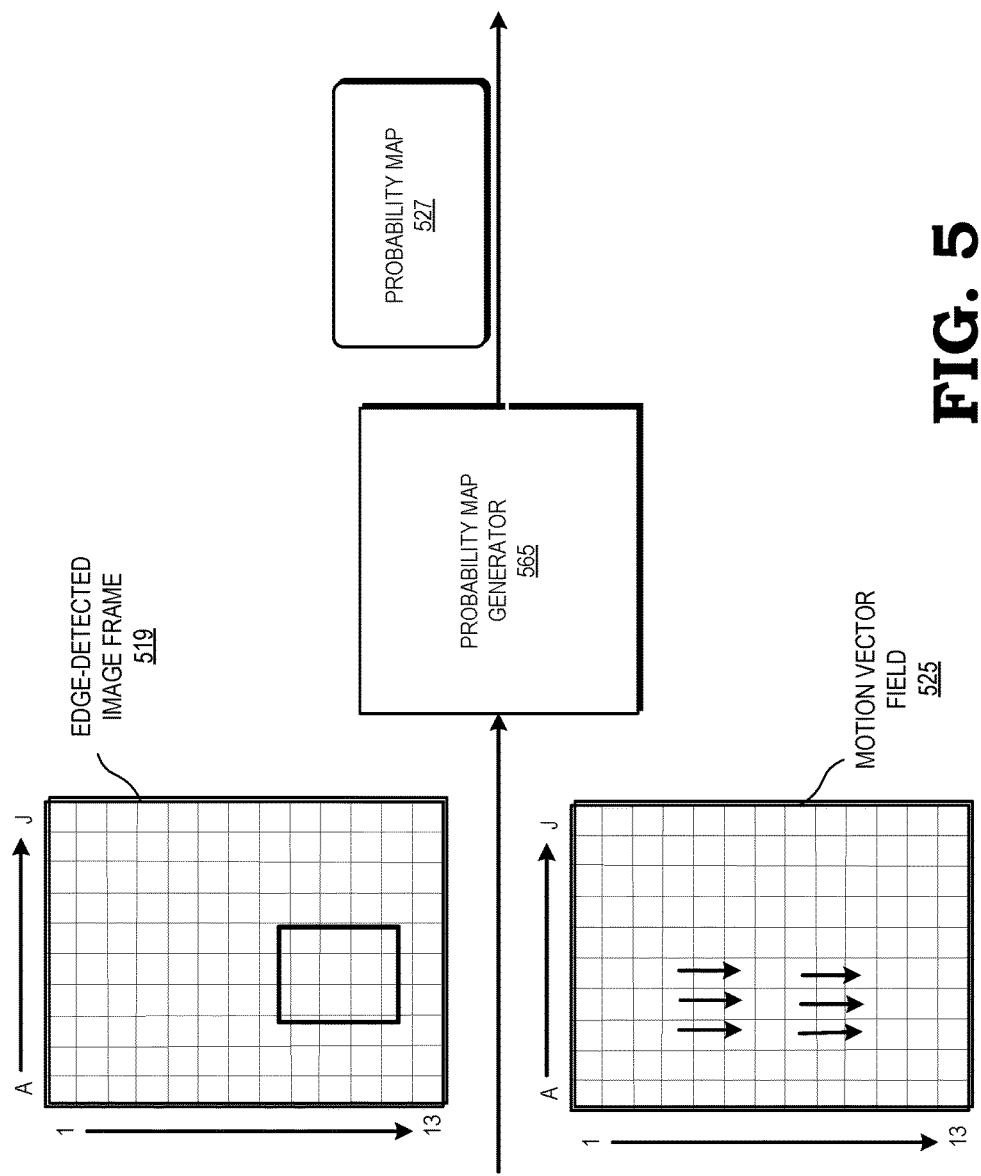
FIG. 5 is a block diagram of a probability map generator of the rendering processor of FIG. 2 according to some embodiments.

FIG. 5 is a block diagram of a probability map generator 565 of the rendering processor 230 of FIG. 2 according to some embodiments. The probability map generator 565 receives an edge-detected N image 519 from the edge detector (not shown) and a motion vector field 525 from the motion map generator (not shown). The probability map generator 565 generates a probability map 527 based on the edge-detected image 519 and the motion vector field 525. For each unit of the N+1 image (not shown), the probability map generator 565 assigns a probability indicating the percentage of pixels within the unit that will be holes. In some embodiments, the units analyzed by the probability map generator 565 are groups of pixels that are the same as those analyzed by either the motion vector field generator 355 or the edge detector 460, and in some embodiments, the units analyzed by the probability map generator 565 are larger or smaller groups of pixels than those analyzed by the motion vector field generator 355 or the edge detector 460.

The probability map generator 565 bases the probability of a unit containing holes on the estimation that the unit contains an edge and/or the magnitude of the motion vector(s) of the motion map associated with the unit. In some embodiments, the probability map generator 565 bases the probability of a unit containing holes on additional factors, such as the level of detail, or amount of variation of pixel values, within the unit. The probability map 527 indicates the probability of containing a hole associated with each unit of the N+1 image, and distributes the probabilities such that the probabilities of holes are lower in regions of the N+1 image containing units for which more edges, greater motion vectors, and/or more details are estimated.

Figure 6:
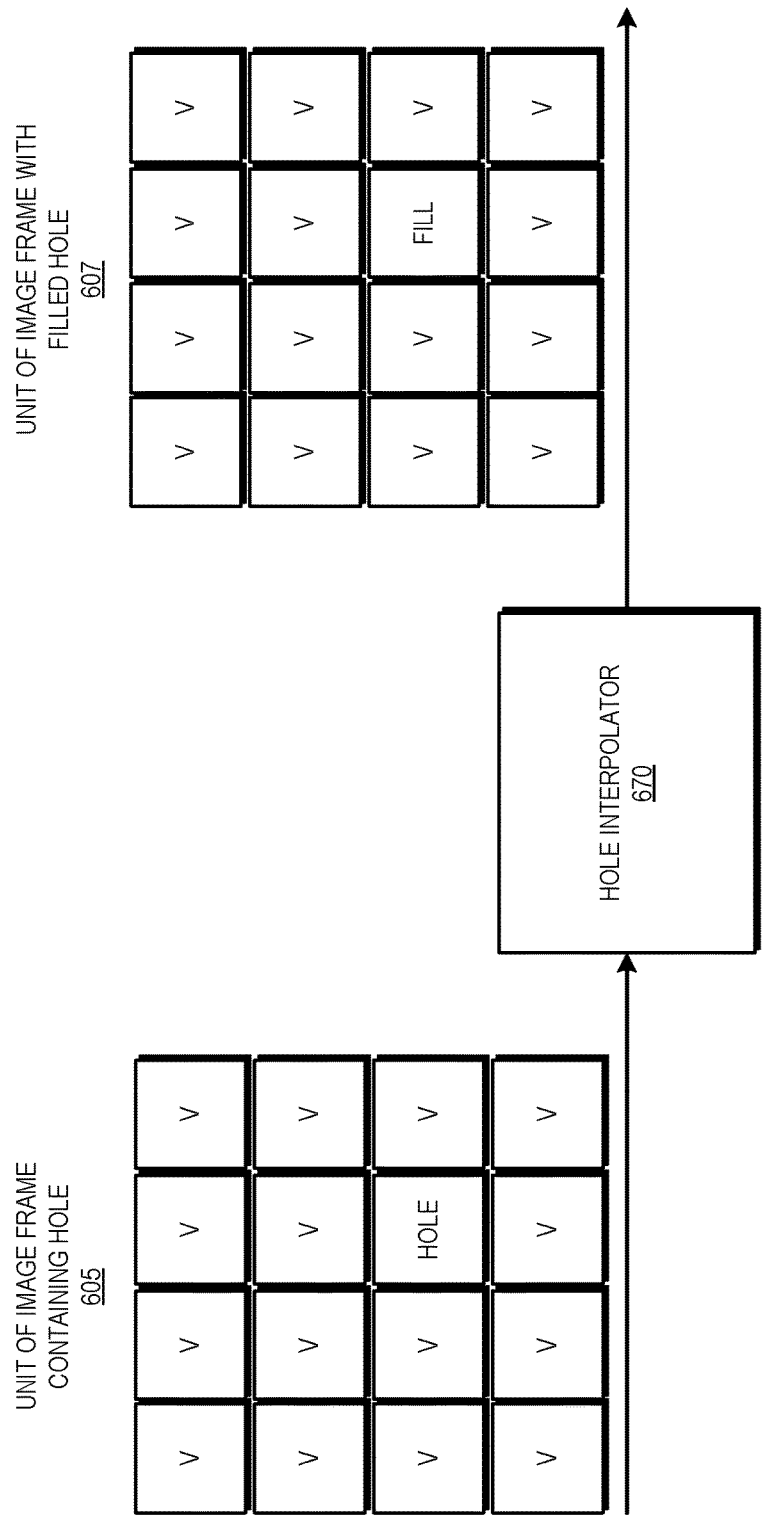
FIG. 6 is a block diagram of a hole interpolator of the rendering processor of FIG. 2 according to some embodiments.

FIG. 6 is a block diagram of a hole interpolator 675 of the rendering processor 230 of FIG. 2 according to some embodiments. The hole interpolator 675 identifies values for filling holes in the rendered N+1 image. In the example illustrated in FIG. 7, a unit 605 of the rendered N+1 image is 4 pixels by 4 pixels, one of which is a hole. The hole interpolator 675 selects a value for filling the hole such that the unit of the image 607 will have values for each pixel, with the hole filled using the value selected by the hole interpolator 675.

In some embodiments, the hole interpolator 675 bases the fill values for each unit of the N+1 image on the corresponding units of the immediately preceding (N) image (not shown). In some embodiments, if one or more of the pixels of the N image corresponding to the holes of the N+1 image are also holes, the hole interpolator 675 replaces the holes of the N image and the holes of the current image with the same constant to generate revised versions of the N image and the N+1 image. The hole interpolator 675 provides the revised images to the motion vector field generator (not shown). The motion map generator compares corresponding units of revised N and N+1 images to create a revised motion vector field (not shown). The hole interpolator 675 compares the holes of the N+1 image to the revised motion vector field, and assigns values for filling the holes of the N+1 image based on units of the N image that the hole interpolator 675 predicts will move into the holes of the N+1 image based on the revised motion vector field. If the correlation between the N image and the N+1 image is below a threshold, in some embodiments, the hole interpolator 675 assigns values for filling some holes of the N+1 image based on a local average of the pixels adjacent to the hole.

Figure 7:
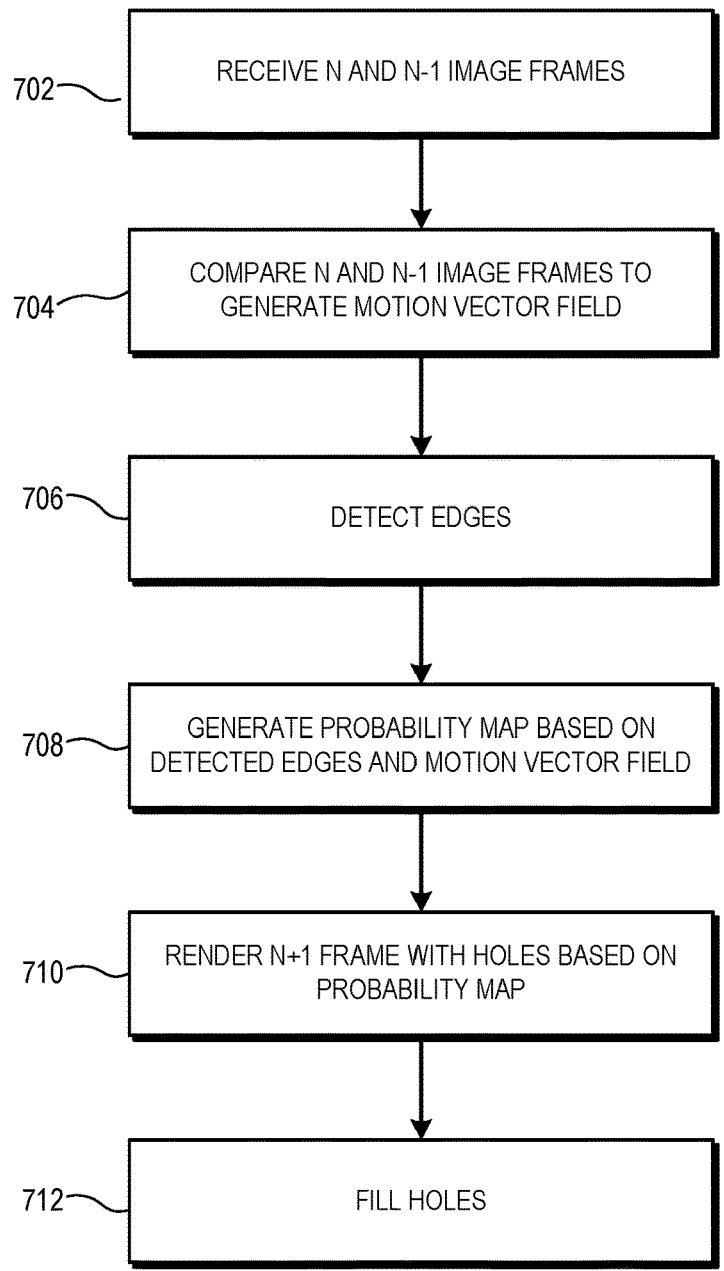
FIG. 7 is a flow diagram illustrating a method for generating a probability map for holes and identifying values for filling holes for rendering a temporally foveated image based on a motion vector field according to some embodiments.

FIG. 7 is a flow diagram of a method 700 for generating a mask identifying holes and identifying values for filling holes for rendering a temporally foveated image based on motion estimation according to some embodiments. The method 800 is implemented in some embodiments of the processing system 100 shown in FIG. 1 and the motion estimator engine 220 and rendering processor 230 shown in FIG. 2.

At block 702, the motion estimator engine 220 receives the two most recently rendered (N and N−1) images. At block 704, the motion vector field generator 255 of the motion estimator engine 220 compares the N and N−1 images to generate a motion vector field 225. At block 706, edge detector 260 of the rendering processor 230 estimates which units of the N image contain edges. At block 708, the probability map generator 265 generates a probability map indicating probabilities of containing a hole for each unit of the N+1 image, based on the motion vector field 225 (assuming the N and N−1 images correlate above a threshold) and the detected edges. The probability map distributes the probabilities of holes such that units of the N+1 image that are estimated to contain edges or moving areas are less likely to contain holes than units that are not estimated to contain edges or moving areas.

At block 710, the renderer 270 of the rendering processor 230 renders the N+1 image, leaving holes where indicated by the probability map. At block 712, the hole interpolator 275 of the rendering processor 230 fills the holes of the N+1 image. If the N and N−1 images are sufficiently correlated, the hole interpolator 275 bases the fillers for the holes of the N+1 image on the corresponding units of the N image. In some embodiments, if the N image contains holes at the pixels corresponding to the holes of the N+1 image, the hole interpolator 275 assigns a constant to the holes of both the N image and the N+1 image, and the motion vector field generator 255 generates a revised motion vector field based on the revised N and N+1 images. The hole interpolator 275 then identifies values to be used to fill the holes of the N+1 image based on the revised motion vector field.

In some embodiments, the apparatus and techniques described above are implemented in a system including one or more integrated circuit (IC) devices (also referred to as integrated circuit packages or microchips), such as the multimedia system described above with reference to FIGS. 1-7. Electronic design automation (EDA) and computer aided design (CAD) software tools are used in the design and fabrication of these IC devices. These design tools typically are represented as one or more software programs. The one or more software programs include code executable by a computer system to manipulate the computer system to operate on code representative of circuitry of one or more IC devices to perform at least a portion of a process to design or adapt a manufacturing system to fabricate the circuitry. This code includes instructions, data, or a combination of instructions and data. The software instructions representing a design tool or fabrication tool typically are stored in a computer readable storage medium accessible to the computing system. Likewise, the code representative of one or more phases of the design or fabrication of an IC device, in some embodiments, is stored in and accessed from the same computer readable storage medium or a different computer readable storage medium.

A computer readable storage medium includes any non-transitory storage medium, or combination of non-transitory storage media, accessible by a computer system during use to provide instructions and/or data to the computer system. Such storage media include, but are not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium, in one embodiment, is embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software includes one or more sets of executable instructions stored or otherwise tangibly embodied on a non-transitory computer readable storage medium. The software includes the instructions and certain data that, when executed by the one or more processors, manipulate the one or more processors to perform one or more aspects of the techniques described above. The non-transitory computer readable storage medium includes, for example, a magnetic or optical disk storage device, solid state storage devices such as Flash memory, a cache, random access memory (RAM) or other non-volatile memory device or devices, and the like. The executable instructions stored on the non-transitory computer readable storage medium are implemented, for example, in source code, assembly language code, object code, or other instruction format that is interpreted or otherwise executable by one or more processors.

Note that not all the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above about specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   estimating, at a motion estimator engine, a motion vector for each of a plurality of units of a first image, each unit comprising one or more pixels, by comparing corresponding units of a second image and a third image, wherein the second image comprises an image rendered immediately prior to the first image and the third image comprises an image rendered immediately prior to the second image;
   identifying, at a rendering processor, for each of the plurality of units, a probability that pixels comprising the unit will be unrendered based on a magnitude of the motion vector for the unit; and
   selectively rendering, at the rendering processor, the pixels of each unit of the plurality of units for a resulting rendered image based on the identified probabilities.

2. The method of claim 1, further comprising identifying, for each of the plurality of units, edges and strengths of edges within the unit, and wherein the probability is further based on whether the number or strength of edges within the unit is above a threshold.

3. The method of claim 1, wherein selectively rendering comprises rendering a percentage of the pixels of each unit of the plurality of units corresponding to the probability for each unit.

4. The method of claim 1, wherein the probability that pixels within the unit will be unrendered is proportional to the magnitude of the motion vector for the unit.

5. The method of claim 1, further comprising filling each unrendered pixel of the first image based on a value of a corresponding pixel of the second image.

6. The method of claim 1, further comprising filling each unrendered pixel of the first image based on a local average of pixels of the first image adjacent to the unrendered pixel.

7. The method of claim 1, further comprising:
   assigning a constant to each unrendered pixel of the first image to generate a revised first image;
   identifying pixels of the second image that correspond to each unrendered pixel of the first image based on the motion vectors;
   assigning the constant to each corresponding pixel of the second image to generate a revised second image;
   estimating, at the motion estimator engine, a revised motion vector for each of the plurality of units by comparing corresponding units of the revised first image and the revised second image; and
   filling each unrendered pixel of the first image based on the revised motion vector for each unit comprising an unrendered pixel.

8. The method of claim 1, further comprising filling each unrendered pixel based on the motion vector corresponding to the unit comprising the unrendered pixel.

9. A method, comprising:
   identifying, for each unit of a plurality of units of a first image, wherein each unit comprises a group of one or more pixels, a probability that pixels comprising the unit will be unrendered based on the unit comprising more than a first threshold amount of edges or less than a second threshold amount of movement; and
   selectively rendering, at a rendering processor, the pixels of the first image based on the corresponding probabilities.

10. The method of claim 9, further comprising:
    generating, at a motion estimator engine, a motion vector field for the first image based on a comparison between corresponding units of a second image that was rendered immediately prior to the first image and a third image that was rendered immediately prior to the second image.

11. The method of claim 10, further comprising:
    assigning a constant to each unrendered pixel of the first image;
    identifying pixels of the second image that correspond to each unrendered pixel of the first image based on the motion vector field;
    assigning the constant to each corresponding pixel of the second image;
    generating, at the motion estimation engine, a revised motion vector field based on a comparison of corresponding units of the first image and the second image; and
    filling each unrendered pixel based on the revised motion vector field.

12. The method of claim 10, further comprising filling each unrendered pixel based on a value of a corresponding pixel of the second image.

13. The method of claim 9, wherein the probabilities are lower for units comprising more than the first threshold amount or strength of identified edges or less than the second threshold amount of moving areas.

14. The method of claim 9, further comprising filling each unrendered pixel based on a local average of pixels adjacent to the unrendered pixel.

15. A device, comprising:
    a motion estimator engine configured to generate a motion vector field for a first image based on a comparison between corresponding units of a second image that was rendered immediately prior to the first image and a third image that was rendered immediately prior to the second image, wherein each unit comprises one or more pixels; and
    a rendering processor configured to:
        identify, for each of the plurality of units of the first image, a probability that the pixels comprising the unit will be unrendered based on the motion vector field; and
        selectively render the pixels of the first image based on the corresponding probabilities.

16. The device of claim 15, wherein the rendering processor is to render a percentage of the pixels of each unit of the plurality of units corresponding to the probability for each unit.

17. The device of claim 15, wherein the rendering processor is further configured to identify, for each of the plurality of units of the first image, edges and strengths of edges within the unit, and wherein the probabilities are lower for units comprising more than a first threshold amount or strength of identified edges and less than a second threshold amount of moving areas.

18. The device of claim 15, wherein the rendering processor is to fill each unrendered pixel based on a value of a corresponding pixel of the second image.

19. The device of claim 15, wherein the rendering processor is to fill each unrendered pixel of the first image based on a local average of pixels of the first image adjacent to the unrendered pixel.

20. The device of claim 15, wherein the motion estimator engine is further to:
  replace each unrendered pixel of the first image with a constant to generate a revised first image;
  identify pixels of the second image that correspond to each unrendered pixel of the first image based on the motion vector field;
  replace each corresponding pixel of the second image with the constant to generate a revised second image;
  generate a revised motion vector field based on a comparison of corresponding units of the revised first image and the revised second image; and
  wherein the rendering processor is further to fill each unrendered pixel based on the revised motion vector field.

* * * * *